Patented May 25, 1954

2,679,451

UNITED STATES PATENT OFFICE 2,679,451

BLACK GRANULAR LEAD PEROXIDE AND PROCESS THEREFOR

Edward A. Staba, Higganum, Conn., assignor to Olin Industries, Inc., New Haven, Conn., a corporation of Delaware No Drawing. Application April 17, 1951, Serial No. 221,517

10 Claims. (Cl. 23—146)

This invention relates to a process of producing a black granular lead peroxide that is more suitable for use in priming mixtures and other explosive compositions than the commercially available lead peroxide heretofore used in such compositions.

Ammunition primers and other explosive compositions include a material that will readily supply oxygen to support combustion of the fuel which forms an ingredient of the primer. As priming mixtures should not change in composition during storage of the ammunition between time of manufacture and time of use, it is a prerequisite that the various ingredients be not only stable, but be capable of remaining in contact and admixture with other priming mixture ingredients for indefinite periods of time under various humidity and temperature conditions without reacting with the other ingredients.

Although lead peroxide has been extensively used in priming mixtures and other explosive compounds, the commercial available material has several disadvantages. It is a chocolate-brown material characterized by low apparent density and very fine particle size. Due to the fine particle size, the surface area is extremely large, resulting in high chemical reactivity and thus to instability of the compound in priming mixtures. The $PbO_2$ content of the material generally runs between ninety and ninety-five percent; higher purity seems impossible to attain because of either or both the mechanical difficulties of washing or filtering the material and the adsorption or occlusion of impurities.

As a result of its physical characteristics, when it is used in a wet priming mixture, it alters the normal granular texture considerably because it is very finely divided. If much more than seven percent is incorporated in a wet lead styphnate mixture, the mixture assumes a muddy texture to such a degree that it cannot be charged into primers by conventional methods. The texture of a mixture containing seven percent commercial lead peroxide is not altered to such an extent it cannot be used successfully, but it does impose operating difficulties. The tendency of such mixture to smear and coat working surfaces renders neat operation impossible, and increases thereby, the hazard involved. The weight of the pellets formed from such mixture is more variable as a result of its tendency to cling to the bed of the charge table and knock out pins.

The color imparted to styphnate mixtures as a result of inclusion of commercial lead peroxide is also an objection. This peroxide is so finely divided that it acts as a pigment imparting its brown color to the mixture. This color causes considerable difficulty on inspection of primed rimfire shells since there is insufficient contrast between the color of the mixture and that of the brass of the cartridge.

I have produced lead peroxide in a physical form that has many advantages over commercial lead peroxide. My product is a granular black material of higher $PbO_2$ content, of larger particle size and therefore less surface area, and of high apparent density. Because of its greater coarseness, it does not have the objectional effect on the texture of wet lead styphnate mixtures. It also does not alter the normal color of a priming mixture. When a pigment, such as Prussian blue, is used in a primer to provide contrast between brass and the priming mixture to facilitate inspection, commercial lead peroxide completely masks its color. This difficulty is not encountered with the lead peroxide of the present invention.

Lead peroxide has generally been made by a one step oxidation of a dissolved or suspended divalent lead compound such as litharge (PbO), lead acetate or nitrate or lead carbonate by means of an oxidizing agent such as chlorine or chlorate or hypochlorite or by means of an electrolytic process. In the present invention I employ a two-stage process which results in the granular lead peroxide hereinafter more fully described and having the advantages set forth. In the first stage, the divalent lead compound is converted to a granular precipitate of a lead compound in which the lead is at an intermediate stage of oxidation, such as $Pb_3O_4$. In the second stage, this intermediate precipitate is converted to the granular dark lead peroxide.

Using sodium hypochlorite as the oxidizing agent in both steps of the process, the first step in the process is carried out in the presence of a fairly high concentration of sodium or other alkali hydroxide. The hydroxide apparently accomplishes two purposes in this step, first, it prevents the oxidation of lead ions to the peroxide stage and, second, it promotes the crystallization of the $Pb_3O_4$ into a granular precipitate. In the second stage of the process, the granular precipitate is oxidized by means of sodium hypochlorite to granular dark peroxide product, which is quite similar with respect to particle size distribution to the intermediate lead compound.

As a detailed example of the process of producing the lead peroxide of the present invention, the following is cited by way of example without limiting the invention to the precise details of the disclosure. In the first stage of the process, the materials used and quantities are as follows:

5,570 grams PbO (technical grade)
3,400 ml. NaClO (15% available chlorine)
2,400 grams NaOH (technical grade flake caustic soda)

The caustic soda is first dissolved in eight (8) liters of water, preferably with agitation to expedite the dissolving. The solution is then heated to 100° C. without agitation. The litharge or other divalent lead compound is then added. This is done by sprinkling while agitating the liquid to prevent lumping. After the litharge has been added, the volume is adjusted to ten liters by the addition of water. Heating and agitation are continued until the mixture is at 90° C. when the addition of hypochlorite is started. With the quantities of materials mentioned, the sodium hypochlorite solution is then added in a period of 30–40 minutes, the mixture being maintained at 95–100° C. The agitation is continued 10 to 15 minutes, without heat, following the addition of hypochlorite and the intermediate red lead oxide compound is separated and washed by decantation. Generally, three washes are employed.

In the second phase of the process, the washed red lead is suspended in ten (10) liters of water. The mixture is heated with vigorous stirring until a temperature of 90° is reached. A volume of 8500 ml. of the above hypochlorite solution is added to the suspension of red lead over a period of 30 to 40 minutes. An excess of sodium hypochlorite over theoretical of about 25% is used to insure complete oxidation of the red lead and produce a high purity product. Sufficient agitation to keep the red lead in suspension is necessary, as otherwise it will not be thoroughly oxidized and a product of inferior quality will result.

After completion of the addition of the sodium hypochlorite solution, agitation is continued 10 to 15 minutes without heat. The product is then washed a number of times, about eight, by decantation with water at a temperature of 75° C. It is then filtered on a Bunchner funnel and dried in an oven at a temperature of approximately 60° C. The number of washings is determined by testing a quantity of wash water qualitatively for chloride. If any chloride is present, the washing is continued. A sample of the final product, dried, screened through a 200 mesh sieve and ground, when analyzed by the Diehl-Topf method, shows a $PbO_2$ content of 96–98%.

To show the difference between the product and commercial lead peroxide of the one-step oxidation method, the following values are cited:

|  | Commercial $PbO_2$ | Black Granular $PbO_2$ |
|---|---|---|
| Percent $PbO_2$ | 90–95 | Greater than 95. |
| Apparent density grams/cc | .779 | 2.14. |
| Particle size range, microns | 0.5–7 | 2–23. |
| Average particle diameter, microns | 2.0 | 7.5. |
| Relative surface area | 1.0 | .28. |

This material has been tested extensively in a priming mixture of the following composition:

Lead styphnate _____ 45
Tetrazene _____ 3
Lead peroxide _____ 7
Barium nitrate _____ 22
Ground glass _____ 22
Gum arabic _____ 1
Prussian blue _____ 0.3

However, this granular lead peroxide will be found advantageous in other types of priming mixtures and explosive compositions. For example, it can be used with any of the suitable explosive ingredients of priming mixtures, such as lead azide, mercury fulminate, lead nitrate-hypophosphite, and basic lead styphnate as well as with complex salts such as lead styphnate-hypophosphite. Likewise, various known fuel ingredients such as antimony sulphide or lead thiocyanate may be employed.

In connection with the greater stability of the lead peroxide of this application over the commercial form, two lots of priming mixture, one containing commercial lead peroxide, the other containing lead peroxide of this application and otherwise identical, were prepared. The initiator was lead styphnate. It is known that the commercial form of lead peroxide has a tendency to react with lead styphnate, and more rapidly, with any free styphnic acid that may be present. Two lots of rimfire shells were primed. The primed shells were placed in humid storage. Samples of each lot were removed from storage for examination after 106 days. Microscopic examination of mixture removed from the primed shells revealed that in the mixture containing commercial lead peroxides (commercial $PbO_2$) the lead peroxide had completely disappeared. In the mixture containing lead peroxide of this invention, however, lead peroxide appeared to be present in the same condition and quantity as it had prior to humid storage.

Even though the product is much coarser than commercial lead peroxide, it performs as effectively as an oxidizer in a priming mixture. Ballistic tests showed no perceptible difference between the two in ignition or sensitivity characteristics.

The product also is of advantage in production. Commercial lead peroxide has a lead peroxide content of 90–95% $PbO_2$. My product never has a $PbO_2$ content below 95% and it is generally from 96% to 98%. The finely divided particles of commercial lead peroxide tend to form clumps, and removal of occluded impurities is difficult. The coarser particles of my product have a much less tendency to occlude impurities.

The coarse crystalline peroxide has a much higher apparent density than the commercial type. It is a free flowing granular material, while the commercial article consists of fine particles which tend to cling together and form lumps. Although the commercial peroxide consists of finer particles, it does not pass through a sieve as readily as the coarse crystalline peroxide. The latter thus provides the advantages of easier screening and other handling operations. While such advantages are of less importance in connection with wet-mixed priming compositions, wherein the improved texture and stability available use of the product of the present invention are of greatest significance, the high apparent density and free-flowing characteristic may well constitute the most highly advantageous features of the granular lead peroxide product of this invention for use in other explosive and pyrotechnic applications.

I claim:
1. Black, free-flowing lead peroxide having an apparent density of approximately 2.14 grams per cubic centimeter and containing at least 95 percent $PbO_2$.

2. Black, free-flowing lead peroxide having a particle size range of from 2 to 23 microns and an average particle diameter of 7.5 microns and containing at least 95 percent $PbO_2$.

3. Black, free-flowing lead peroxide having an apparent density of approximately 2.14 grams per cubic centimeter, having a particle size range of from 2 to 23 microns, an average particle diameter of 7.5 microns and containing at least 95 percent $PbO_2$.

4. The process of making lead peroxide of large particle size and high apparent density which comprises oxidizing a divalent lead compound to an intermediate stage of oxidation by treating a solution of such compound with an oxidizing agent in the presence of an alkali hydroxide at an elevated temperature, removing the intermediate compound from the solution, suspending it in water and then treating it with an oxidizing agent to complete the oxidation to lead peroxide.

5. The process of making lead peroxide of large particle size and high apparent density which comprises oxidizing a divalent lead compound to an intermediate stage of oxidation by treating a solution of such compound with a chlorine compound containing available oxygen in the presence of an alkali hydroxide at an elevated temperature, removing the intermediate compound from the solution, suspending it in water and then treating it with a chlorine compound containing available oxygen to complete the oxidation to lead peroxide.

6. The process of making lead peroxide of large particle size and high apparent density which comprises oxidizing a divalent lead compound to an intermediate stage of oxidation by treating a solution of such compound with sodium hypochlorite in the presence of an alkali hydroxide at an elevated temperature, removing the intermediate compound from the solution, suspending it in water and then treating it with a sodium hypochlorite to complete the oxidation to lead peroxide.

7. The process of making lead peroxide of large particle size and high apparent density which comprises oxidizing litharge to an intermediate stage of oxidation by treating litharge with an oxidizing agent in the presence of an alkali hydroxide solution at an elevated temperature, removing the intermediate compound from the solution, suspending it in water and then treating it with an oxidizing agent to complete the oxidation to lead peroxide.

8. The process of making lead peroxide of large particle size and high apparent density which comprises oxidizing litharge to an intermediate stage of oxidation by treating litharge with a chlorine compound containing available oxygen in the presence of an alkali hydroxide solution at an elevated temperature, removing the intermediate compound from the solution, suspending it in water and then treating it with a chlorine compound containing available oxygen to complete the oxidation to lead peroxide.

9. The process of making lead peroxide of large particle size and high apparent density which comprises oxidizing litharge to an intermediate stage of oxidation by treating litharge with sodium hypochlorite in the presence of an alkali hydroxide solution at an elevated temperature, removing the intermediate compound from the solution, suspending it in water and then treating it with a sodium hypochlorite to complete the oxidation to lead peroxide.

10. The process of making lead peroxide of particle size ranging from approximately two microns to approximately 23 microns which comprises forming an aqueous solution of sodium hydroxide, heating the solution to approximately 100° C., adding litharge thereto while agitating the solution, adding sodium hypochlorite in the theoretical amount to oxidize the litharge to red lead while maintaining the solution at a temperature of 95 to 100° C., continuing the agitation of the solution without heat for an appreciable period after the addition of the sodium hypochlorite has been completed, removing the red lead from the solution by decantation and washing, suspending it in water, heating the suspension to a temperature of 90° C. and agitating the solution, adding sodium hypochlorite in an excess of about 25 percent over the amount theoretically required to form lead peroxide, agitating and heating the suspension to maintain a temperature of at least 90° C. during the addition of the sodium hypochlorite, continuing the agitation of the suspension for a period of 15 to 20 minutes after the addition of the sodium hypochlorite has been completed, and removing the lead peroxide from the solution by decanting and washing.

References Cited in the file of this patent

UNITED STATES PATENTS

| Number | Name | Date |
|---|---|---|
| 1,506,633 | Grunbaum | Aug. 26, 1924 |

FOREIGN PATENTS

| Number | Country | Date |
|---|---|---|
| 502,194 | Great Britain | Mar. 14, 1939 |
| 627,328 | Germany | Mar. 13, 1936 |
| 697,068 | Germany | Oct. 4, 1940 |
| 210,595 | Switzerland | Oct. 1, 1940 |
| 24,637 | Sweden | May 2, 1908 |

OTHER REFERENCES

Mellor, "Comprehensive Treatise on Inorganic and Theoretical Chemistry," vol. 7, pages 681, 682, Longmans, Green and Co., N. Y. C., 1927.

Mellor, "Modern Inorganic Chemistry," page 706, Longmans, Green and Co., N. Y. C., 1939.

Kutnetsov, "J. Chem. Ind.," U. S. S. R., vol. 14, pages 671–674 (1937); cited from Chem. Abstracts, vol. 31, column 6829 (1937).

Newell et al., "Inorganic Synthesis," vol. I, H. S. Booth, editor-in-chief, pages 45–47, McGraw-Hill Book Co., Inc., N. Y. C., 1939.